Dec. 17, 1957 E. BREITENBORN 2,816,600
PADDING FOR SEATS, MATTRESSES AND THE LIKE
Filed Sept. 13, 1954
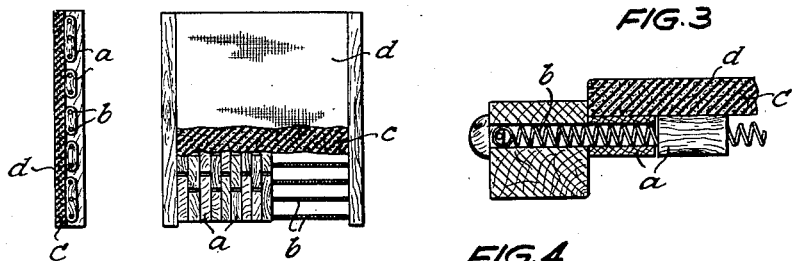
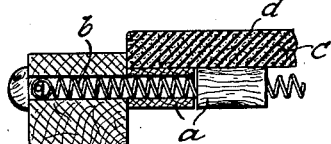
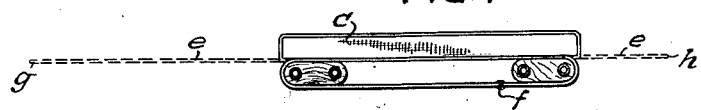
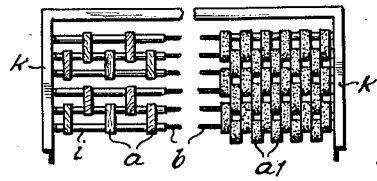
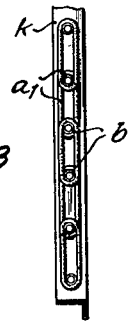
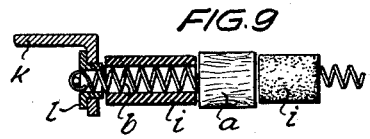
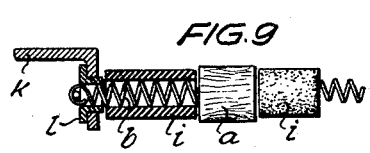
INVENTOR
Ernst Breitenborn
By Bryant & Lowry
Attys.

United States Patent Office 2,816,600
Patented Dec. 17, 1957

2,816,600

PADDING FOR SEATS, MATTRESSES AND THE LIKE

Ernst Breitenborn, Wolfhagen, Bezirk Kassel, Germany

Application September 13, 1954, Serial No. 455,467

6 Claims. (Cl. 155—184)

The present invention relates to a padding for seats, mattresses and the like using sponge rubber layers Such paddings are already known wherein the layers consist either of a solid base or of supports comprising wide spaced springs which are connected by chains, wires or the like. As the sponge rubber is very soft and yieldable its cross-section must be correspondingly thick or pressure points of the upright springs or the like would be felt through the layer. Furthermore, the soft rubber is pressed under load between the wide spaced springs and destroyed in a relatively short time.

In order to avoid these disadvantages, measures have been taken in the case of wide spaced spring supports which measures are intended to prevent the soft rubber from being pressed against the springs and becoming damaged and consist in placing thin intermediate paddings on the spring base and the sponge rubber layers on these intermediate paddings. Apart from the high cost of production, the sponge rubber layer in this construction is not ventilated and becomes moist on its under side.

One object of the invention is to overcome these objections and to provide a sponge rubber padding in which it is possible to use a thinner sponge rubber layer so as to effect a saving of up to 50% in this material.

The present invention has for another object to provide a padding for seats, easy chairs, mattresses and the like employing sponge or foam rubber layers which are directly carried by a spring supporting surface without using intermediate paddings or the like.

The spring surface used herein consists of rows of spiral springs extending longitudinally in horizontal direction. Such spring surfaces are known per se, however, in order to obtain a smooth and even supporting surface these rows of springs are, according to the present invention, interconnected by laminae arranged in stepped formation, the spaces between the individual laminae being so chosen that, besides providing for a smooth supporting surface, sufficient airing is also ensured.

The characteristic features of the invention consist in that the sponge rubber layer is supported on a resilient surface composed of plates or laminae which produce a flat support, and is nevertheless yieldable. These laminae forming the resilient surface are arranged in rows in known manner on spiral springs which extend transversely or longitudinally to the direction of the seat or reclining surface.

When using such a laminated spring support for the sponge rubber, evaporation of moisture from the sponge rubber layer is not impeded and thus it is possible to produce, for example, mattresses with sponge rubber layers which do not possess the disadvantages of the known constructions.

Several preferred embodiments of the invention are illustrated by way of example in the accompanying drawing, in which:

Fig. 1 is a top plan view of a resilient surface with sponge rubber layer and cover, in which the laminae are arranged close together;

Fig. 2 shows a section of this arrangement;

Fig. 3 shows the arrangement in front elevation, partly in section, on a larger scale;

Fig. 4 indicates how a layer of sponge rubber and cover can be advantageously fitted on a seat or back of an easy chair. The arrangement is shown in side elevation, the support formed of laminae being only partly illustrated;

Fig. 5 is a portion of a spring support, for example for mattresses having a metal frame, the laminae being arranged at a distance apart on the left side whereas on the right side endless loops of rubber, textile or other suitable material are employed instead of the laminae. In these constructions particular importance is attached to the elimination of all noises;

Fig. 6 is a side elevation of the surface formed of laminae with spacers, whereas in Fig. 7 a spring support is shown in side elevation wherein the laminae are replaced by endless loops of sound deadening material, such as rubber, textile or the like;

Fig. 8 shows how instead of these loops, shaped elements of rubber or other suitable material can be used, the ends of which are rolled in tubular shape and which allow these tubular ends to unroll on the springs when being sat upon and which automatically roll in again and surround their supporting springs after being sat upon;

Fig. 9 is a part front elevation and part section showing the separation or isolation of the spiral springs from the carrier frame.

In the drawing $a$ designates laminae forming the resilient support, which are threaded on e. g. tensioned spiral springs $b$. $c$ is a sponge rubber layer and $d$ a cover therefor. In Fig. 4 the cover $d$ of the sponge rubber layer $c$ is fixed on a cloth length $e$ provided at its ends $g$ and $h$ with sliding clasp fasteners which can be closed at $f$ after the layer $c$ has been placed on the laminated spring support, so that the layer cushion is firmly connected to the resilient support. This arrangement presents the advantage that the padded layers can easily be exchanged or removed for the purpose of cleaning and again fitted in position.

In order to obtain a soft and noiseless or practically silent spring support when employing metal frames $k$, the arrangement of the laminae and springs as shown in Figs. 5 to 9 is provided. For this purpose the spiral springs $b$ are separated at their ends from the metal frames $k$ by sleeves or caps $l$ of sound-deadening material such as rubber. In the case of spaced laminae $a$ the gaps between the laminae are filled by sleeves or tubular spacers $i$ made from sound-deadening material, such as cardboard, rubber or the like. Endless loops $a^1$ as shown in Fig. 7 of rubber, textile or similar material can also be used instead of the laminae $a$. Shaped elements of rubber or other suitable material as shown in Fig. 8 can moreover be used instead of the loops $a^1$, the ends of which elements are rolled in tubular shape so that they unroll when being sat upon and then automatically close around the springs. The use of such shaped elements as laminae presents the advantage that the laminae need not be threaded on to the spiral springs but the whole supporting surface, as far as the springs are concerned, can be assembled and it is subsequently possible to fit the shaped elements.

The embodiments of the invention illustrated allow resilient supports, especially for sponge rubber layers, to be produced for all purposes which come into question for articles of furniture for sitting and reclining upon, which supports ensure a good ventilation of the support and a uniformly soft spring suspension, so that intermediate paddings or protecting layers are unnecessary for the layers of padding themselves, with the result that the cost of production is considerably less.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A padding for seats, mattresses and the like of the type having layers of sponge rubber supported on a spring surface composed of parallel rows of spiral springs, wherein the rows of spiral springs are interconnected by laminae formed as transverse members arranged one behind the other in stepped formation and so spaced as to constitute a substantially smooth supporting surface for the padding layers and ensure good aeration, said laminae being connected by springs on which they are threaded and consist of endless loops of sound-deadening material.

2. A padding for seats, mattresses and the like of the type having layers of sponge rubber supported on a spring surface composed of parallel rows of spiral springs, wherein the rows of spiral springs are interconnected by laminae formed as transverse members arranged one behind the other in stepped formation and so spaced as to constitute a substantially smooth supporting surface for the padding layers and ensure good aeration, said laminae being carried by springs and consist of shaped elements of elastic material the ends of which are rolled in tube shape which unroll when being sat upon and automatically return into their original shape after being sat upon.

3. A padding for seats, mattresses and the like of the type having layers of sponge rubber supported on a spring surface composed of parallel rows of spiral springs, wherein the rows of spiral springs are interconnected by laminae formed as transverse members arranged one behind the other in stepped formation and so spaced as to constitute a substantially smooth supporting surface for the padding layers and ensure good aeration, said laminae being threaded on spiral springs fixed at their ends to a metal frame and separated therefrom by tubular elements of sound-deadening material.

4. In a bottom for beds, chair seats and the like, a frame having parallel sides, a series of coiled tension springs extending in parallelism between said sides, plate members connecting said springs and having flat portions extending above and between pairs of said springs, said flat portions all having their flat portions lying in a common plane, in combination with a layer of porous rubber resting on the flat surfaces of said plate members.

5. In a bottom for beds, chair seats and the like, a frame having parallel sides, a series of coiled tension springs extending in parallelism between said sides, plate members connecting said springs and having flat portions extending above and between pairs of said springs, said flat portions all having their flat portions lying in a common plane, the lateral edges of each of said plate members contacting corresponding edges of adjacent plate members, in combination with a layer of porous rubber resting on the flat surfaces of said plate members.

6. In a bottom for beds, chair seats and the like, a frame having parallel sides, a series of coiled tension springs extending in parallelism between said sides, plate members connecting said springs and having flat portions extending above and between pairs of said springs, said flat portions all having their flat portions lying in a common plane, the lateral edges of each of said plate members contacting corresponding edges of adjacent plate members, said plate members being staggeringly arranged, in combination with a layer of porous rubber resting on the flat surfaces of said plate members.

References Cited in the file of this patent

UNITED STATES PATENTS

| | | |
|---|---|---|
| 242,633 | Guerrant, et al. | June 7, 1881 |
| 1,029,881 | Micon | June 18, 1912 |
| 1,738,831 | Kean | Dec. 10, 1929 |
| 2,281,341 | Turner | Apr. 28, 1942 |
| 2,565,870 | McGuire | Aug. 28, 1951 |
| 2,625,210 | Eull | Jan. 13, 1953 |

FOREIGN PATENTS

| | | |
|---|---|---|
| 26,464 | Great Britain | 1898 |
| 592,627 | Great Britain | Sept. 24, 1947 |